(12) United States Patent
Malaescu et al.

(10) Patent No.: US 10,455,147 B2
(45) Date of Patent: Oct. 22, 2019

(54) IMAGE PROCESSING METHOD

(71) Applicant: FotoNation Limited, Galway (IE)

(72) Inventors: Alexandru Malaescu, Bucharest (RO); Florin Nanu, Bucharest (RO); Stefan Petrescu, Bucharest (RO); Peter Corcoran, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 245 days.

(21) Appl. No.: 14/964,379

(22) Filed: Dec. 9, 2015

(65) Prior Publication Data

US 2016/0165129 A1    Jun. 9, 2016

Related U.S. Application Data

(60) Provisional application No. 62/089,369, filed on Dec. 9, 2014.

(51) Int. Cl.
*H04N 5/232* (2006.01)
*G06T 5/00* (2006.01)
*G02B 7/09* (2006.01)
*G01B 11/14* (2006.01)

(52) U.S. Cl.
CPC ........ *H04N 5/23219* (2013.01); *G01B 11/14* (2013.01); *G02B 7/09* (2013.01); *G06T 5/003* (2013.01); *H04N 5/23212* (2013.01)

(58) Field of Classification Search
CPC ... H04N 5/23219; H04N 5/23212; G02B 7/09
USPC .................................................. 348/78, 135
See application file for complete search history.

(56) References Cited

U.S. PATENT DOCUMENTS

| | | | | |
|---|---|---|---|---|
| 2008/0199056 A1* | 8/2008 | Tokuse | ............... | G06K 9/00295 382/118 |
| 2009/0190023 A1* | 7/2009 | Mise | ..................... | G03B 13/00 348/345 |
| 2009/0256953 A1* | 10/2009 | Yasuda | .................. | G03B 13/32 348/349 |
| 2009/0310029 A1* | 12/2009 | Tanaka | ............... | H04N 7/17318 348/729 |
| 2010/0157135 A1* | 6/2010 | Dossaji | ..................... | G02B 7/36 348/348 |
| 2010/0208091 A1* | 8/2010 | Chang | ................ | H04N 5/23212 348/222.1 |

(Continued)

FOREIGN PATENT DOCUMENTS

| WO | WO2005015896 | 2/2005 |
|---|---|---|
| WO | WO2008018887 | 2/2008 |

*Primary Examiner* — Jeremiah C Hallenbeck-Huber

(57) ABSTRACT

A method of processing an image comprises: acquiring an image of a scene including an object having a recognizable feature. A lens actuator setting providing a maximum sharpness for a region of the image including the object and a lens displacement corresponding to the lens actuator setting are determined. A distance to the object based on the lens displacement is calculated. A dimension of the feature as a function of the distance to the object, the imaged object size and a focal length of a lens assembly with which the image was acquired, is determined. The determined dimension of the feature is employed instead of an assumed dimension of the feature for subsequent processing of images of the scene including the object.

8 Claims, 2 Drawing Sheets

(56) References Cited

U.S. PATENT DOCUMENTS

| | | | |
|---|---|---|---|
| 2011/0002680 A1* | 1/2011 | Narasimha | G03B 3/00 |
| | | | 396/124 |
| 2012/0044408 A1* | 2/2012 | Sasaki | H04N 5/23212 |
| | | | 348/345 |
| 2012/0075492 A1* | 3/2012 | Nanu | H04N 5/23212 |
| | | | 348/222.1 |
| 2012/0218456 A1* | 8/2012 | Sweet, III | H04N 5/23212 |
| | | | 348/345 |
| 2012/0320258 A1* | 12/2012 | Nakagawara | H04N 5/23212 |
| | | | 348/349 |
| 2014/0160019 A1* | 6/2014 | Anda | G09G 5/00 |
| | | | 345/158 |
| 2015/0206338 A1* | 7/2015 | Miura | G06F 3/013 |
| | | | 345/419 |
| 2016/0140406 A1* | 5/2016 | Chu | G06K 9/00221 |
| | | | 382/118 |
| 2016/0150215 A1* | 5/2016 | Chen | H04N 13/0239 |
| | | | 348/47 |

* cited by examiner

IMAGE PROCESSING METHOD

BENEFIT CLAIM

This application claims the benefit and priority to U.S. Provisional Application Ser. No. 62/089,369, filed Dec. 9, 2014. The contents of all of these documents are incorporated herein by reference, as if fully set forth herein. The applicants hereby rescind any disclaimer of claim scope in the parent application or the prosecution history thereof and advise the USPTO that the claims in this application may be broader than any claim in the parent applications.

FIELD

The present invention relates to a method of processing an image.

BACKGROUND

Face detection and tracking is well known in image processing for example as described in European Patent No. EP2052347 (Ref: FN-143). These techniques enable one or more face regions within a scene being imaged to be readily delineated and to allow for subsequent image processing based on this information. Such image processing can include face recognition which attempts to identify individuals being imaged; auto-focussing by bringing a detected and/or selected face region into focus; or defect detection and/or correction of the face region(s).

It is well known that anthropometric information can be employed in processing face regions. For example, knowledge of an expected face size can be used for in face detection or filtering for example, for example, for falsing analysis of red-eye candidates as described in EP1654865 (Ref: FN-101-CIP).

However, problems can occur if a scene being imaged includes any faces which do not conform to common anthropometric rules. For example, if a scene includes a billboard with a very large human face, processing based on common anthropometric rules could indicate a real subject much closer to the camera than the billboard. This could for example, indicate that the camera should focus at a much shorter distance and if it were to do so, an out of focus image would be produced.

Correspondingly, if a scene includes a small child, then detection of their face could indicate a subject much further from the camera than the child. This could for example, indicate that the camera should focus at a much longer distance and again, if it were to do so, an out of focus image would be produced.

For the purposes of the present disclosure, the term "false face" will be used to indicate regions of an image including detected faces which do not conform to normal anthropometric rules.

In some cases, failure to appreciate that a false face has been detected could cause an isolated image to be acquired with incorrect focus, and in a video camera, capturing a stream of images of a scene, it is possible that the camera might lose its ability of focus properly.

Nonetheless, it will be appreciated that the above outlined problems could equally arise if attempting to base image processing on any falsely detected object. For example, some image processing could be based on rules relating to the dimensions of automobiles and clearly image of false automobiles, for example, displayed on billboards, could be captured which could cause problems.

SUMMARY

According to the present invention, there is provided an image processing method according to claim 1.

In a further aspect, there is provided an image processing device arranged to perform the method of claim 1.

In a still further aspect, there is provided a computer program product comprising computer readable instructions, which when executed in an image processing device are arranged to perform the method of claim 1.

Embodiments of the present invention provide rapid auto-focus based on detected faces but without being adversely affected by false faces and indeed being able to focus properly on such false faces.

Alternative embodiments provide auto-focusing based on any detectable object of interest with a feature with known dimensions.

BRIEF DESCRIPTION OF DRAWINGS

An embodiment of the invention will now be described, by way of example, with reference to the accompanying drawings, in which.

DESCRIPTION OF THE EMBODIMENT

Figure 1:
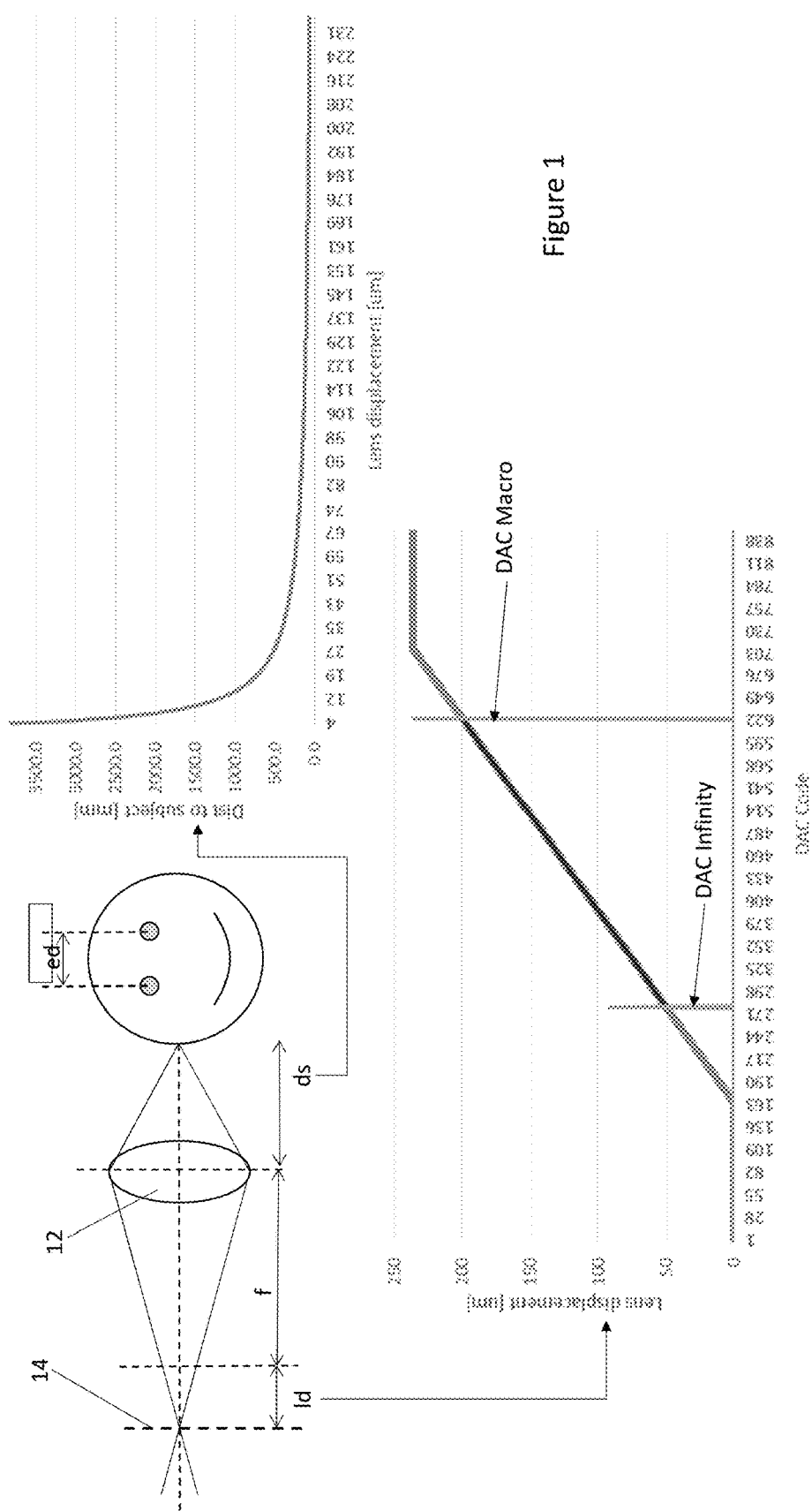
FIG. 1 illustrates the use of anthropometric data in a focussing system.

Referring now to FIG. 1, in order to focus on any object at an infinity position (typically more than 3 meters), the distance between a lens 12 and an image sensor 14 is set just equal with the focal length (f) of the lens.

When a face is in a hyper-focal range of a lens, with given distance to the subject (ds), in order to get a focused image, the lens should be displaced by a distance (ld), so that the distance between the lens and an image sensor is f+ld.

Thus, distance to subject versus lens displacement are linked by the formula: $1/f = 1/ds + 1/(f+ld)$ as illustrated graphically in FIG. 1.

When a required lens displacement ld is determined, a camera can select a required digital-to-analog convert (DAC) code for displacing a lens assembly incorporating the lens as required to properly maintain focus on the face.

An image processing system using detected faces to assist with focusing can operate as follows:

1. Detect a face for example, using techniques such as disclosed in EP2052347 (Ref: FN-143);
2. Calculate the eye distance in pixels (edp) within the detected face region;
3. Assume eye distance in centimeters ed≅7 cm;
4. Using the camera focal length (f) and pixel size (ps), calculate the distance to the subject (ds) as follows:

$ds = f*(ed/(edp*ps))$;

5. Calculate the lens displacement (ld) for this distance (ds) using the following relation:

$1/(ld+f) = 1/f - 1/ds$;

6. Knowing the lens displacement, calculate the corresponding DAC Code for the focus position based on calibrated data as shown in FIG. 1.

Consider for example, if a false face with an eye distance ed=2 cm (a small face) had in fact been detected at step 1 above. A focusing algorithm, using an ed=7 cm would consider the small face to be very far, determining a very large distance to the subject (ds) and a corresponding DAC Code, probably close to infinity. This would result in a highly defocused image.

Figure 2:
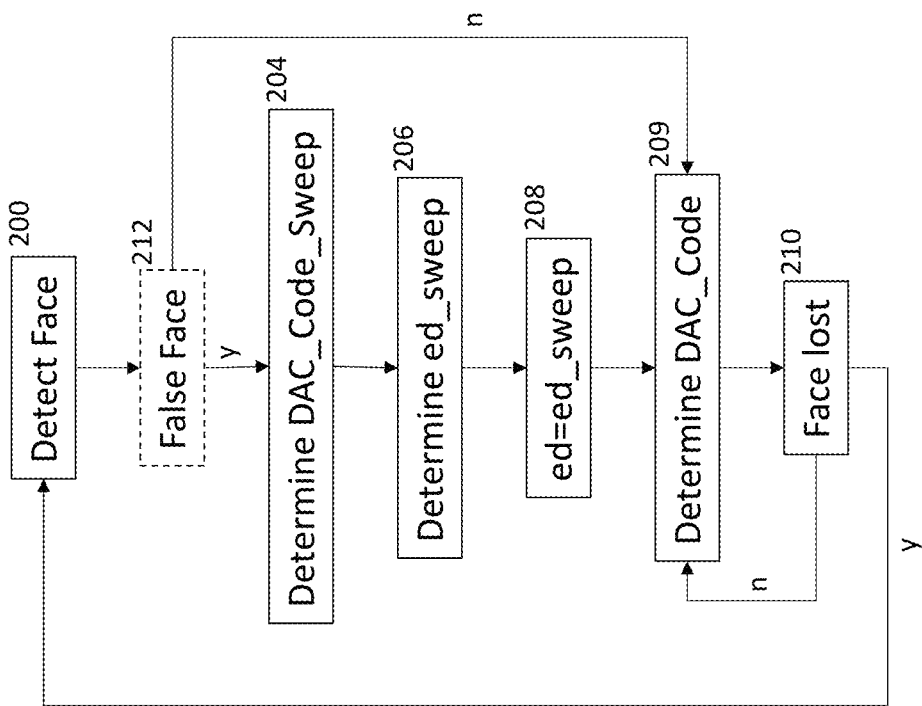
FIG. 2 is a flow diagram illustrating a method of processing an image according to an embodiment of the present invention.

Referring now to FIG. 2, in an embodiment of the present invention, a number of additional steps are taken to avoid a false face causing image acquisition problems:

Firstly, at step 200, a face is detected within a face region of an acquired image;

On detecting the face, a sweep of focus positions is performed to determine a DAC Code providing maximum sharpness for the face region—DAC_Code_Sweep, step 204. This sweep can be performed over a number of preview images; or in some systems where it is possible to acquire images faster than a display update rate, the sweep can be performed at millisecond intervals such as discussed in WO 2014/124787 (Ref: FN-387);

Once DAC_Code_Sweep is known, steps 4-6 outlined above are reversed, step 206:

Thus, the lens displacement (ld_sweep) corresponding to DAC_Code_Sweep is calculated from the calibrated data shown in FIG. 1;

The distance to the subject ds_sweep is calculated from ld_sweep, again using the relation of step 5 above;

Now knowing "ds_sweep", "edp" and "f", the real eye distance in centimeters can be calculated and in this case, it would provide ed_sweep=2 cm.

Now as long as this particular face is to be tracked, instead of using the common eye distance (ed=7 cm), a face specific eye distance (ed=2 cm) is temporarily set as the eye distance for the newly detected face region, step 208.

This overwriting of the standard eye distance should be kept only as long as the false face is tracked. Once the face is lost, step 210, the common eye distance (ed=7 cm) is used again for newly detected faces.

Otherwise, for each new image to be acquired, the required DAC code is calculated based on the calculated eye distance, step 209.

It will be appreciated that a full sweep is not necessarily required to each time a new face is detected and that for example, a modified sweep can be performed to determine if a detected face is false, step 212. So, for example, for the lens displacement at which an image including a newly detected face is acquired, the lens can be displaced to a lens displacement position either side of the image acquisition lens displacement.

If the sharpness of the face region at the image acquisition lens displacement is a maximum relative to the sharpness for the adjacent lens displacement positions, then the estimation is regarded as good. In this case, image processing continues at step 209 to determine the required DAC code for each new image in which the face region continues to be detected based on the assumed eye distance ed=7 cm.

However, if the sharpness of the face region is not a maximum, it indicates that the face within the newly detected face region is false, so triggering a full sweep, step 204, to determine ed_sweep as described above.

It will be appreciated that steps 204 to 208 need only be performed once for a detected object; however, the steps could also be repeated in response to a sharpness for the face region dropping below a given threshold.

The present invention can be employed wherever image processing relies on detecting an object having a feature with known dimensions, so enabling a temporary rather than assumed set of dimensions to be used for the object while it is being tracked and enabling focus to be maintained on the object while it is being tracked.

It will be seen that the present invention can be employed for image processing other than auto-focusing and for example, can be employed to temporarily overwrite an assumed object dimension for the purposes of processing images containing a false version of such an object.

The invention claimed is:

1. A method of processing an image with a lens assembly having a given focal length for acquiring images, comprising:
    a) acquiring an image of a scene including a detected imaged object having a recognizable feature and determining whether the detected imaged object is a false face or other false object comprising the recognizable feature, where a false object is one which does not conform to normal anthropometric rules;
    b) if the imaged object is determined to be a false face or other false object, determining, based on variation in focus position, a lens actuator setting providing a maximum sharpness for said false object;
    c) determining a lens displacement corresponding to said lens actuator setting for said false object;
    d) calculating a distance to said false object based on said lens displacement;
    e) determining a dimension of said recognizable feature of said false object as a function of said distance to said false object, size of said imaged false object and the focal length of the lens assembly with which said image of said false object comprising the recognizable feature was acquired; and
    f) performing autofocusing based on said determined dimension of said recognizable feature of said imaged false object instead of an assumed dimension of said feature for subsequent processing of images of said scene including said false object.

2. A method according to claim 1 wherein said object is a human face, the feature is eyes and the dimension is the distance between said eyes.

3. A method according to claim 1 wherein steps b) to e) are performed only once for a newly detected object.

4. A method according to claim 1 wherein steps b) to e) are performed in response to a sharpness for the region of said image including said object dropping below a given threshold.

5. A method according to claim 1 further comprising the following step of checking if the lens actuator setting for acquiring said image provides maximum sharpness for the region of said image including said object and responsive to said sharpness not being maximal prior to step b), then performing steps b) to e).

6. A method according to claim 1 wherein said subsequent processing includes performing auto-focusing based on said determined dimension for the object while it is being tracked and enabling focus to be maintained on the object while it is being tracked.

7. An image processing device arranged to perform the method of claim 1.

8. A computer program product comprising computer readable instructions, which when executed in an image processing device are arranged to perform the method of claim 1.

* * * * *